(12) United States Patent
Stein et al.

(10) Patent No.: US 8,672,238 B2
(45) Date of Patent: Mar. 18, 2014

(54) SPRAY HEAD FOR A BLOWER TUBE OF A SPRAY APPARATUS

(75) Inventors: Marcus Stein, Filderstadt (DE); Markus Herzog, Weinstadt (DE); Christine Bähr, Ebersbach (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 686 days.

(21) Appl. No.: 12/662,816

(22) Filed: May 5, 2010

(65) Prior Publication Data

US 2010/0282875 A1 Nov. 11, 2010

(30) Foreign Application Priority Data

May 6, 2009 (DE) .......................... 10 2009 020 095

(51) Int. Cl.
*B05B 7/06* (2006.01)
(52) U.S. Cl.
USPC .......................... 239/432; 239/419.3; 239/434
(58) Field of Classification Search
USPC ......... 239/150, 152, 650, 396, 294, 299, 502, 239/466, 467, 500, 518, 407, DIG. 21
See application file for complete search history.

(56) References Cited

U.S. PATENT DOCUMENTS

| 166,803 | A | * | 8/1875 | Oyston | .......................... 239/502 |
| 3,597,166 | A | * | 8/1971 | Hochman | ...................... 422/220 |
| 5,372,312 | A | * | 12/1994 | Vidusek | ..................... 239/419.3 |
| 7,673,813 | B2 | | 3/2010 | Raffenberg et al. | |
| 2004/0123991 | A1 | * | 7/2004 | Hanratty | .......................... 169/14 |
| 2005/0279863 | A1 | * | 12/2005 | Malcolm | ....................... 239/461 |

* cited by examiner

*Primary Examiner* — Len Tran
*Assistant Examiner* — Viet Le
(74) *Attorney, Agent, or Firm* — Walter Ottesen P.A.

(57) ABSTRACT

A spray head is provided for a blower tube of a spray apparatus. The blower tube is adapted to conduct a blower air flow to the spray head (20) in a flow direction (18). The spray head includes a supply pipe (13) for a medium to be sprayed such as a liquid. The spray head also includes an inlet opening for receiving the blower air flow (40) and an outlet opening through which the blower air flow is discharged from the spray head enriched with the medium. The supply pipe (13) has an outer feed connection for the medium and a discharge opening (29) in the interior of the spray head for admixing the medium into the blower air flow (40). The discharge opening (29) defines a plane aligned in the flow direction (18) and an impediment is disposed at the edge of the discharge opening lying upstream with respect to the flow direction (18). The impediment disturbs the blower air flow entering the spray head through the inlet opening before it flows over the discharge opening. In this way, noise excitation is avoided while obtaining a good atomization of the medium.

**15 Cla

SPRAY HEAD FOR A BLOWER TUBE OF A SPRAY APPARATUS

CROSS REFERENCE TO RELATED APPLICATION

This application claims priority of German patent application no. 10 2009 020 095.9, filed May 6, 2009, the entire content of which is incorporated herein by reference.

FIELD OF THE INVENTION

The invention relates to a spray head for a blower tube of a spray apparatus having a supply pipe for a medium to be sprayed.

BACKGROUND OF THE INVENTION

A spray apparatus is known from U.S. Pat. No. 7,673,813. The spray head is an end section which can be attached to a blower tube. An outer supply pipe passes through the spray head and is transverse to the flow direction. Via an outer supply connection, the medium to be sprayed, such as a liquid or similar spray medium, is supplied from a spray medium tank and emitted into the blower air flow via a discharge opening inside the spray head.

It has been shown in practice that the blower air generates noise in the spray head which acoustically burdens the surroundings and the operator.

SUMMARY OF THE INVENTION

It is an object of the invention to provide a spray head of the kind referred to above wherein the noise generated by the blower air is reduced as much as possible.

The spray head of the invention is for a blower tube of a spray apparatus with the blower tube being adapted to conduct a blower air flow to the spray head in a flow direction. The spray head includes: a supply pipe for a medium to be sprayed; an inlet opening for receiving the blower air flow; an outlet opening through which the blower air flow is discharged from the spray head enriched with the medium; the supply pipe having an outer feed connection for the medium and a discharge opening in the interior of the spray head for admixing the medium into the blower air flow; the discharge opening defining a plane aligned in the flow direction; the discharge opening defining an edge lying upstream; and, an impediment disposed at the edge for the blower air flow entering the spray head through the inlet opening.

By arranging an impediment on the upstream edge of the discharge opening, the incoming blower air is disturbed before it passes over the discharge opening and noises generated at the discharge opening are prevented. The noise emitted by the spray head is significantly lowered.

Advantageously, all the discharge openings inside a spray head are provided with impediments so that a discharge channel, which is centrally fed from the supply pipe, has an impediment at both ends with the ends being formed as discharge openings.

In a preferred embodiment of the invention, the spray head is configured as a one-piece component with the supply pipe and the internal structures. The discharge opening has a slider opening arranged in the wall of the spray head which is coaxial with the discharge opening and the discharge channel. An impediment for incoming air is arranged upstream of the slider opening at the edge thereof so that the incoming blower air is disturbed before it passes over the slider opening as in the case of the discharge opening.

In this way, the slider openings, which are structurally necessary for a one-piece implementation of the spray head, cause no noise excitation during operation. The spray head can be manufactured by simple means as a plastic injection-molded part with the impediments provided at the openings being formed on the spray head as one piece during manufacture.

According to the invention, the impediment can be formed as a raised edge of the opening or edge wall in that the impediment surrounds the corresponding opening over a circumferential angle of up to 180°. Advantageously an impediment is provided on each side of an opening over which the blower air flows.

In another embodiment of the invention, all impediments of all openings form one common component which, for example, can be formed as a rod upstream of the opening with the rod being transverse to the flow direction in the blower air flow and the spray head.

In a simple embodiment, the rod is a round rod which is arranged at the edge of an opening. Advantageously the rod is a half cylindrical shell when viewed in cross section.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
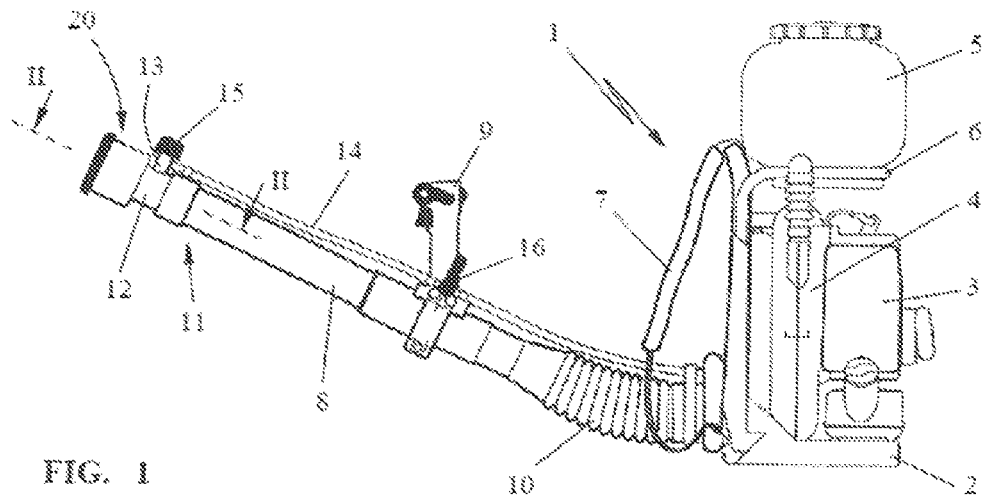
FIG. 1 is a schematic side view of a spray apparatus to be worn on the back of an operator.

The spray apparatus 1 worn on the back of an operator and shown in FIG. 1 largely comprises a carrying assembly 2 with an internal combustion engine 3, which drives a blower 4, held thereon. A spray medium tank 5, which is held on the carrying assembly 2 by a carrying frame 6, is arranged above the internal combustion engine 3 and the blower 4. The operator shoulders the carrying assembly 2 with the engine 3, the blower 4 and the spray medium tank 5 and carries this on his or her back similar to a backpack. Accordingly, the carrying assembly 2 is provided with carrying straps 7.

The blower 4 moves blower air into a blower tube 8 which is guided by the operator via a handle 9 which has operator-controlled elements. The blower tube 8 is connected to the housing of the blower 4 via a flexible blower tube section 10 so that the operator can pivot the blower tube 8, held and guided by the handle 9, in any direction without significant force transmission to the back carrier.

Figure 2:
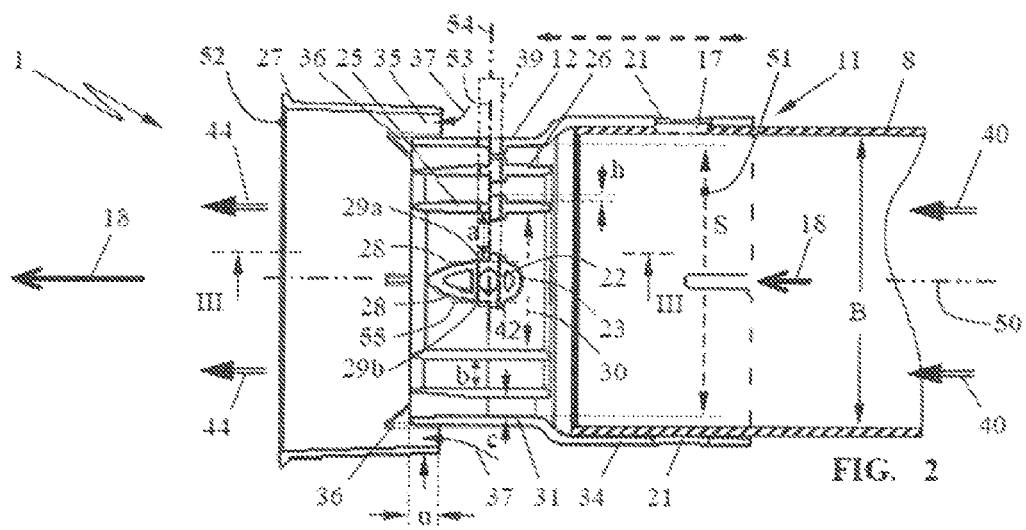
FIG. 2 is a section view through a spray head along line II-II in FIG. 1.

At the front end 11 of the blower tube 8, a spray head 20 is attached, which—as described below—is pushed onto the end 11 of the blower tube section and is secured in its pushed-on state by latching devices 17 (FIG. 2). The spray head 20 thereby forms the end section 12 of the blower tube 8.

A flow body 22 extends into the spray head 20 and forms a supply pipe 13 for the medium to be sprayed such as liquids or similar spray mediums. In the embodiment shown, the supply pipe 13 is fed from the supply hose 14 which is directly connected to the spray medium tank 5. Preferably, the supply hose 14 is connected to the spray medium tank 5 at its lowest point so that the force of gravity can be used to transport the medium.

In the embodiment shown in FIG. 1, a metering valve 15 is provided on the supply pipe to regulate the amount of medium fed into the blower air flow. Advantageously, a stop valve with which the supply hose 14 can be fully blocked is provided at the elevation of the handle 9.

The spray head 20 is shown in individual section views in FIGS. 2 to 5.

The spray head 20 comprises a blower tube section 12 which is attached to the front end 11 of the blower tube 8 as an end section. Latch devices 17 of the blower tube 8 engage into corresponding latch openings 21 of the spray head 20 so that the spray head 20 is held in a predetermined rotational position on the end 11 of the blower tube 8 so that it cannot rotate relative to the blower tube and is axially secured thereto.

Figure 5:
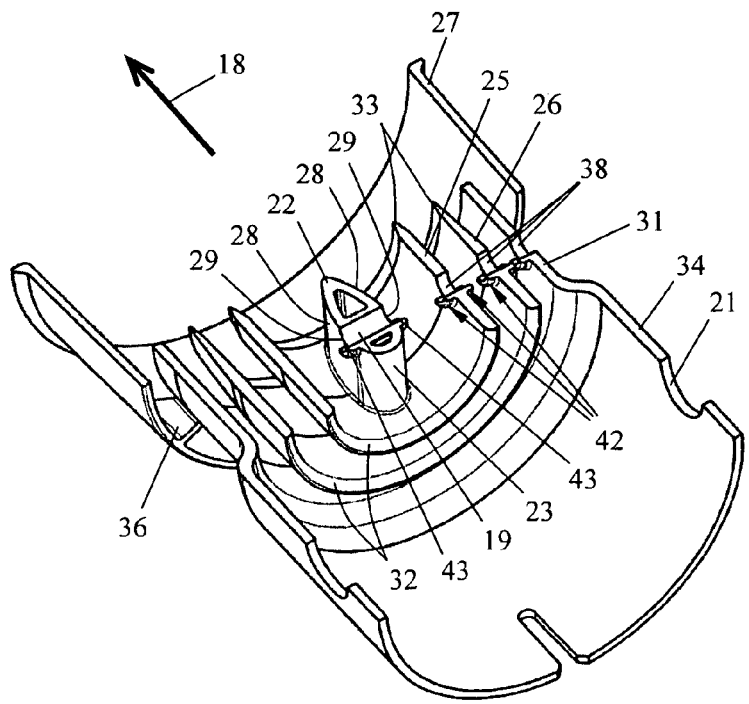
FIG. 5 is a perspective view, in section, through a spray head corresponding to the section view in FIG. 2.

In the embodiment shown, the spray head 20 is traversed along its entire diameter by the flow body 22, which has a wing-like profile and protrudes from the spray head at one end (compare FIGS. 2 and 5). The inflow end 23 of the flow body 22 is rounded in the form of a half circle. In flow direction, the flow body 22 tapers to the above-mentioned wing-like profile, shown in FIGS. 2 and 5.

Figure 4:
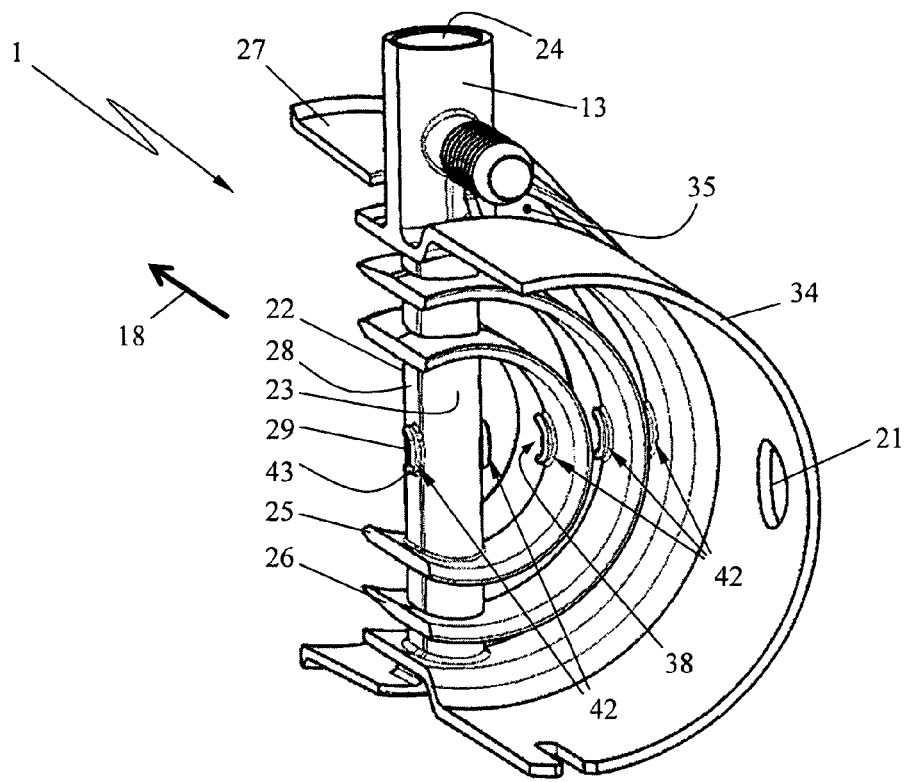
FIG. 4 is a perspective view, partially in section, of a spray head.

The flow body 22, which traverses the spray head 20, forms a supply pipe 13 with a supply channel 24 for the medium to be sprayed and further serves as a carrier for inner guide rings 25 and 26. The inner guide rings (25, 26) lie approximately concentric in the end section 12. A discharge channel 19, which is fed from the supply channel 24, opens in the inner guide ring 25. The discharge channel 19 extends transversely to the flow direction 18 and ends at the converging side walls 28 of the flow body 22. The discharge channel 19 is as shown in the top plan view according to FIG. 2) directly behind the inflow end 23 of the to body 22 in the flow direction. The discharge openings 29*a* and 29*b*, formed by the ends of the discharge channel 19, lie with their respective planes 55 approximately parallel to the flow direction 18. As FIG. 4 shows, the discharge channel 19 lies at the elevation of a diameter 30 which, in the normal state of the blower tube 8 as shown in FIG. 1, is approximately horizontal.

The discharge openings 29 are at a distance (a) to the inner guide ring 25. The discharge openings 29 are disposed approximately at the elevation of the center of the guide ring 25.

Between the inner guide ring 25 and cylinder wall 31 of the end section 12 is a further guide ring 26 which, in the embodiment shown, has a greater distance (b) to the inner guide ring 25 than to the outer cylinder wall 31 to which the guide ring 26 has a distance (c).

FIG. 2 further shows the longitudinal center axis 50 of the spray head. An inlet opening 51 is defined by the spray head 20. Blower air 40 flows through the spray head in flow direction 10 from the inlet opening 51 through the spray head 20 toward the outlet opening 52. The discharge openings 29*a* and 29*b* define longitudinal center axes, 53 and 54, respectively.

As FIG. 5 shows, the inflow end 32 is rounded, while the front portion 33 of a guide ring on the outflow side is tapered in the flow direction 18.

The end section 12 has a connecting section 34, widened in its diameter, into which the front end 11 of the blower tube 8 is inserted. The arrangement is so implemented that the inner diameter B of the blower tube 8 approximately corresponds to the inner diameter S of the spray head.

Figure 3:
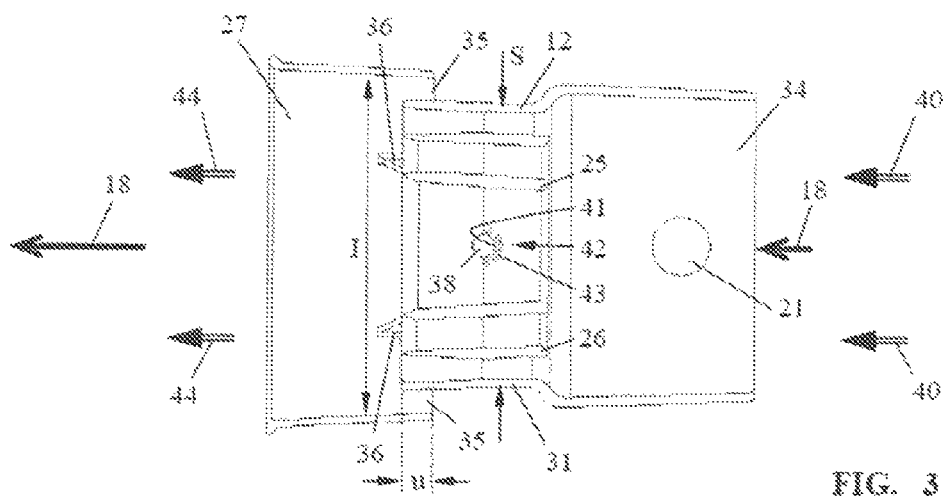
FIG. 3 is a section view through a spray head along the line in FIG. 2.

It can be advantageous that the guide rings 25 and 26 slightly widen in diameter in the flow direction 18, as shown in FIG. 3.

The cylinder wall 31 of the spray head 20 opens into a flow tube 27, which has a greater inner diameter I than the outer diameter of the cylinder wall 31, so that an annular gap 35 results between the cylinder wall 31 of the spray head 20 and the flow tube 27.

The flow tube 27 is held on the outer cylinder wall 31 of the end section 12 by radial ribs 36. The cylinder wall 31 of the end section 12 and the flow tube 27 mutually overlap by an amount (u).

The in-flowing air 40, moved by the blower 4, flows through the spray head 20 in flow direction 18, whereby the medium emitted from the discharge openings 29 as a spray medium is finely dispersed and entrained thereby. The blower air 44, which is out-flowing in direction 18, is thereby enriched with the medium used as spray medium. The spray mist exiting the spray head 20 is additionally mixed with ambient air 37 which flows through the annular gap 35 according to the injector principle.

The shown spray head 20, that is, the blower tube section 12 with its connecting section 34 and the cylinder wall 31, the flow tube 27 and the flow body 22 are formed as a one-piece component, preferably as a one-piece plastic component.

The spray head 20 produced as one piece can thereby be manufactured in a form by a simple manufacturing process wherein the supply channel 24 and the discharge channel 19 are formed by sliders. The slider 39 is provided to form the discharge channel 19 and extends through the guide rings 25 and 26 as well as the cylinder wall 31 so that the finished component has slider openings 38. The planes of the slider openings 38 are approximately parallel to the flow direction 18. The slider openings 38 and the discharge openings 29 are coaxial and parallel to each other.

To reduce the noises generated by the blower air at the openings (29, 38), an impediment 42 for incoming blower air is provided at the upstream edge 41 of the discharge opening 19 and/or the slider openings 38. The impediment 42 is provided on each side of an opening 38 over which blower air flows. The slider openings thus each have an impediment 42 inside and outside of the guide ring (25, 26) on the upstream edge 41 of the opening (29, 38).

In the embodiment according to FIGS. 2 to 5, the impediment is formed as an edge bead 43 or an edge wall which surrounds the edge 41 on the inflow side by an angle of up to 180°. The edge bead 43 or an edge wall thus extends over up to half the circumference of the edge 41 so that the entire inflow side of the opening 38 or the discharge opening 29 is covered. The openings 29 or 38 are thus largely in the wind shadow of the impediment 42. With this measure, the noise generation is significantly reduced so that a quiet spray head is provided. The height of the edge bead or edge wall is only a few millimeters. As FIG. 2 shows, the height (h) corresponds to approximately 20% to 40% of the distance (a) between the discharge opening 29 and the inner guide ring 25 and the distance (b) between the guide rings 25 and 26.

The slider opening 38 provided in the outer cylinder wall 31 has an impediment 42 only on the side facing the outer guide ring 26, since the other side of the slider opening 38 in the cylinder wall 31 does not have blower air flowing over it.

Figure 6:
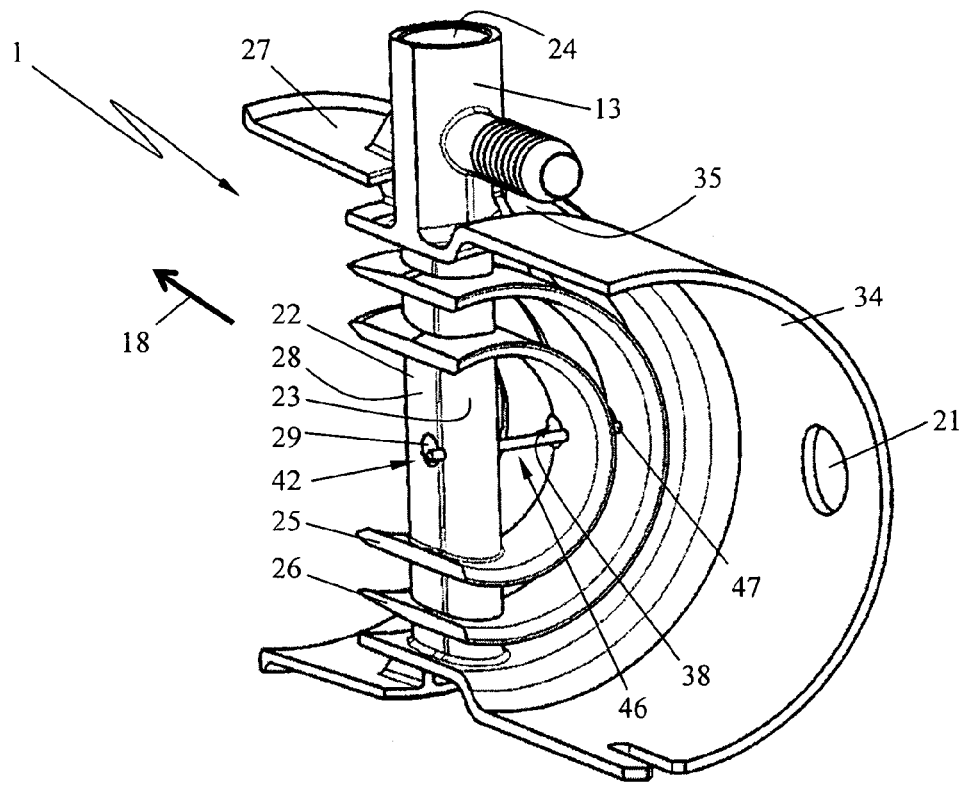
FIG. 6 is perspective view, partially in section, through a spray head in a modified embodiment.
Figure 7:
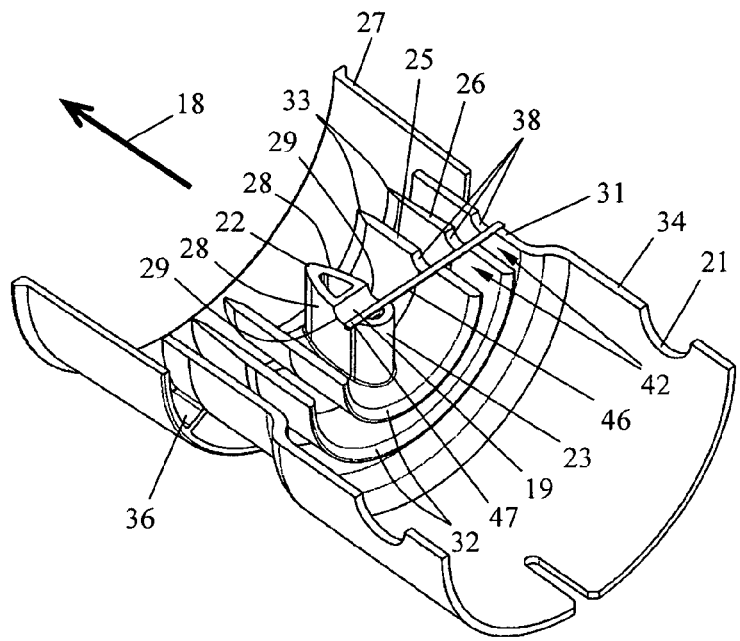
FIG. 7 is a section through a spray head according to FIG. 6 in a view corresponding to FIG. 2.

In a further embodiment of the invention according to FIGS. 6 and 7, an impediment 42 in the form of a rod 46 is arranged on the upstream edge 41 of the discharge opening 29 and on the upstream edge of the slider opening 38. As shown in the embodiment, the rod 46 is advantageously a round rod 47 which shades less than 180° of the angular region of the edge 41. In the embodiment shown, the round rod 47 covers about 30° of an inflow edge section 41. By correspondingly selecting the diameter of the round rod 47, smaller or larger peripheral angles of the edge 41 of the opening 38 can be covered with the inflow edge 41 lying upstream.

In the embodiment according to FIGS. 5 and 6, the rods 46 provided at the individual openings 29 and 38 together form a common round rod 47 which extends from one side of the cylinder wall 31 through the guide rings (25, 26) and the discharge channel 19 (FIG. 7).

Figure 8:
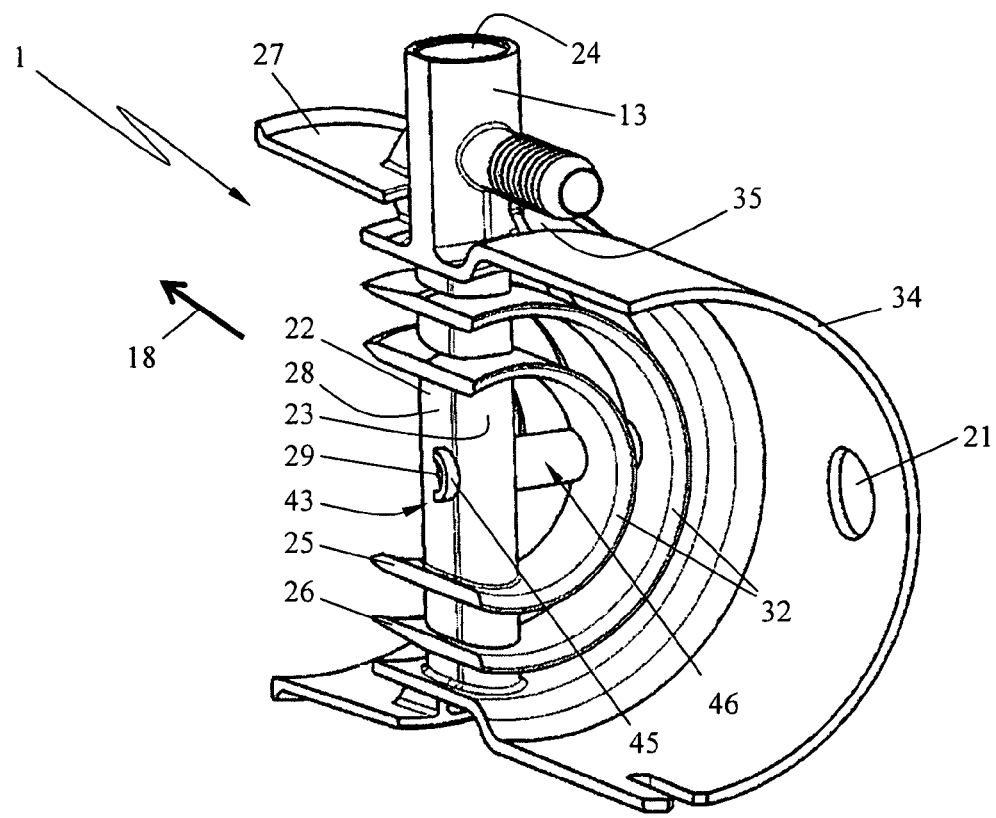
FIG. 8 is a perspective view, partially in section, through a spray head in a further embodiment; and, FIG. 9 is a section view through the spray head according to FIG. 8 in a view corresponding to FIG. 2.
Figure 9:
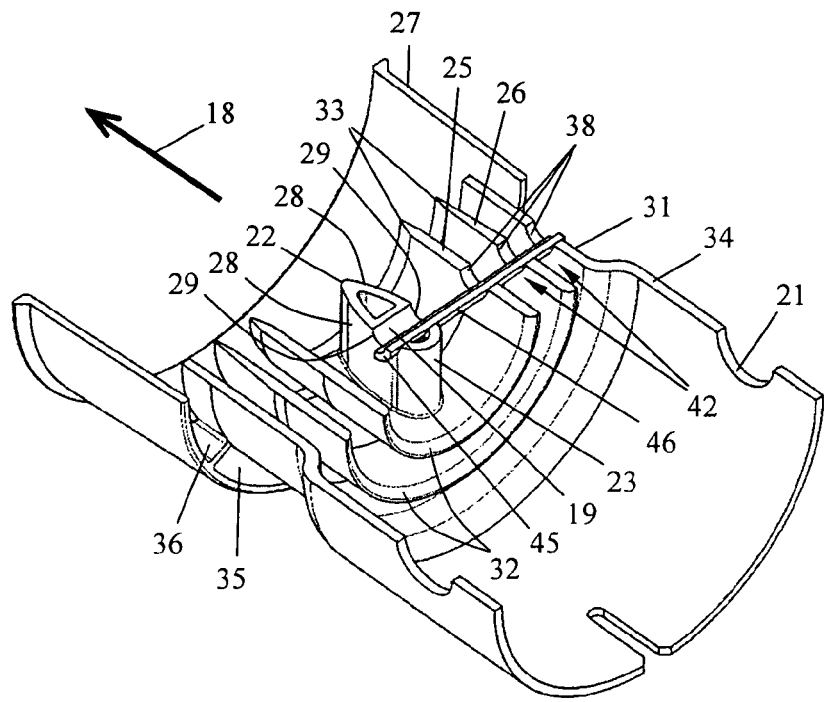

In the embodiments according to FIGS. 8 and 9, the rod 46 is a half cylinder shell 45 whose outer diameter approximately corresponds to the outer diameter of the discharge opening 29 or the slider opening 38. The half cylinder shell 45 extends over half of the circumference of the opening 29 or 38. The assembly is designed in such a manner that the entire upstream inflow edge 41 of an opening (29, 38) is covered or shaded by the half cylinder shell 45.

It is understood that the foregoing description is that of the preferred embodiments of the invention and that various changes and modifications may be made thereto without departing from the spirit and scope of the invention as defined in the appended claims.

What is claimed is:

1. A spray head for a blower tube adapted to conduct a blower air flow to the spray head in a flow direction, the spray head comprising:
   a supply pipe for a medium to be sprayed;
   an inlet opening for receiving said blower air flow;
   an outlet opening through which said blower air flow is discharged from said spray head enriched with said medium;
   wherein said blower air flows in said flow direction along a longitudinal axis of said spray head from said inlet opening toward said outlet opening;
   a flow body extending approximately centrally through said spray head and having a discharge channel disposed therein;
   said supply pipe communicating with said discharge channel in said flow body;
   said flow body having first and second discharge openings disposed on respective sides thereof;
   said discharge channel communicating with said first and second discharge openings for discharging said medium into the interior of said spray head for admixing said medium into said blower air flow;
   said discharge openings defining a plane aligned in said flow direction;
   said discharge openings defining respective edges; and,
   first and second impediments disposed at corresponding ones of said edges for disturbing said blower air flow before said blower air flow passes over said discharge openings;
   said impediments being disposed in said flow direction upstream of said discharge openings.

2. The spray head of claim 1, wherein said impediments are formed as a raised edge bead of said discharge openings.

3. The spray head of claim 1, wherein said impediments surround said discharge openings over a circumferential angle of up to 180°.

4. The spray head of claim 1, wherein said first and second discharge openings are disposed on said respective sides of said flow body so as to cause the medium sprayed into said blower air flow to have a flow direction approximately at right angles to said flow direction of said blower air flow.

5. A spray head for a blower tube adapted to conduct a blower air flow to the spray head in a flow direction, the spray head comprising:
   a supply pipe for a medium to be sprayed;
   an inlet opening for receiving said blower air flow;
   an outlet opening through which said blower air flow is discharged from said spray head enriched with said medium;
   wherein said blower air flows in said flow direction along a longitudinal axis of said spray head from said inlet opening toward said outlet opening;
   said supply pipe having an outer feed connection for said medium and a discharge opening in the interior of said spray head for admixing said medium into said blower air flow;
   said discharge opening defining a plane aligned in said flow direction;
   said discharge opening defining an edge;
   a first impediment disposed at said edge for disturbing said blower air flow before said blower air flow passes over said discharge opening;
   said first impediment being disposed in said flow direction upstream of said discharge opening;
   said spray head having inner structures and said spray head being configured as a single piece with said supply pipe and said inner structures;
   said discharge opening defining a longitudinal center axis transverse to said flow direction;
   said spray head having a wall and a slider opening formed in said wall with said slider opening being assigned to said discharge opening;
   said slider opening having a longitudinal center axis that is disposed coaxially with said discharge opening; and,
   said spray head further including a second impediment disposed upstream of said slider opening.

6. The spray head of claim 5, wherein said inner structures include one or more concentric guide rings arranged in said spray head; and, said guide rings have a second set of slider openings formed therein which are coaxial with said discharge opening.

7. The spray head of claim 6, wherein said spray head comprises further impediments such that one impediment is provided on each side of each one of said slider openings over which said blower air flows.

8. The spray head of claim 5, wherein said impediments of said discharge opening and said slider opening are configured as one common component.

9. The spray head of claim 8, wherein said one common component is a rod arranged upstream of said discharge opening; and, said rod lies transversely to said flow direction in said blower air flow.

10. The spray head of claim 9, wherein said rod is a round rod.

11. The spray head of claim 10, wherein said rod is in the form of a partial cylindrical shell when viewed in cross section.

12. The spray head of claim 10, wherein said rod is configured as a half cylindrical shell when viewed in cross section.

13. The spray head of claim 1, wherein said medium is a liquid.

14. The spray head of claim 5, wherein said second impediment is formed as a raised edge bead of said slider opening.

15. The spray head of claim 5, wherein said second impediment surrounds said slider opening over a peripheral angle of up to 180°.

* * * * *

UNITED STATES PATENT AND TRADEMARK OFFICE
CERTIFICATE OF CORRECTION

Page 1 of 1

PATENT NO. : 8,672,238 B2
APPLICATION NO. : 12/662816
DATED : March 18, 2014
INVENTOR(S) : M. Stein et al.

It is certified that error appears in the above-identified patent and that said Letters Patent is hereby corrected as shown below:

In the Specification

In Column 2:
Line 33: insert -- III-III -- after "line".

In Column 3:
Line 44: delete "is as" and insert -- is (as -- therefor.
Line 46: delete "to" and insert -- flow -- therefor.
Line 65: delete "tion 10" and insert -- tion 18 -- therefor.

Signed and Sealed this
Seventeenth Day of June, 2014

Michelle K. Lee
*Deputy Director of the United States Patent and Trademark Office*